(12) United States Patent
Li et al.

(10) Patent No.: US 11,722,068 B2
(45) Date of Patent: Aug. 8, 2023

(54) ISOLATED SWITCHING CONVERTER WITH SECONDARY SIDE MODULATION AND CONTROL METHOD THEREOF

(71) Applicant: Chengdu Monolithic Power Systems Co., Ltd., Chengdu (CN)

(72) Inventors: Hui Li, Hangzhou (CN); Siran Wang, Hangzhou (CN); Lin Feng, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 118 days.

(21) Appl. No.: 17/546,805

(22) Filed: Dec. 9, 2021

(65) Prior Publication Data

US 2022/0209676 A1    Jun. 30, 2022

(30) Foreign Application Priority Data

Dec. 31, 2020    (CN) .......................... 202011622595.6

(51) Int. Cl.
*H02M 3/335* (2006.01)
*H02M 1/38* (2007.01)
*H02M 3/00* (2006.01)
*H02M 1/00* (2006.01)

(52) U.S. Cl.
CPC ......... *H02M 3/33592* (2013.01); *H02M 1/38* (2013.01); *H02M 3/01* (2021.05); *H02M 1/0058* (2021.05); *H02M 3/33523* (2013.01)

(58) Field of Classification Search
CPC ........ H02M 1/0058; H02M 1/08; H02M 1/38; H02M 1/44; H02M 3/01; H02M 3/335–33592
See application file for complete search history.

(56) References Cited

U.S. PATENT DOCUMENTS

| | | | |
|---|---|---|---|
| 9,065,348 B2 | 6/2015 | Wang et al. | |
| 9,093,909 B2 | 7/2015 | Wang et al. | |
| 9,407,155 B2 | 8/2016 | Wang et al. | |
| 9,595,885 B2 | 3/2017 | Wang et al. | |
| 10,348,182 B2 | 7/2019 | Wang | |
| 10,804,806 B1 * | 10/2020 | Finkel | H02M 3/33507 |

(Continued)

OTHER PUBLICATIONS

U.S. Appl. No. 17/474,698, filed Sep. 14, 2021, Hangzhou MPS Semiconductor Technology Ltd.

*Primary Examiner* — Fred E Finch, III
(74) *Attorney, Agent, or Firm* — Perkins Coie LLP

(57) ABSTRACT

A controller of an isolated switching converter having a primary and secondary switch, the controller includes a valley detection circuit for providing a valley pulse signal in response to valleys of a resonant voltage, a pulse frequency modulation circuit for providing a pulse frequency modulation signal based on a feedback signal indicative of an output voltage, a primary on enable circuit for providing a primary on enable signal based on the pulse frequency modulation signal and valley pulse signal, a secondary logic circuit for generating a secondary control signal to control the secondary switch based on a primary off detection signal, a zero cross detection signal and the primary on enable signal, and a primary logic circuit for generating a primary control signal to control the primary switch based on a synchronous signal electrically isolated from the primary on enable signal.

20 Claims, 10 Drawing Sheets

(56) References Cited

U.S. PATENT DOCUMENTS

| | | | |
|---|---|---|---|
| 2011/0149614 A1* | 6/2011 | Stracquadaini ... | H02M 3/33507 29/602.1 |
| 2017/0155335 A1* | 6/2017 | Chang .................... | H02M 1/36 |
| 2021/0028695 A1* | 1/2021 | Su .......................... | H02M 3/01 |
| 2022/0103078 A1* | 3/2022 | Fan ................... | H02M 3/33507 |
| 2022/0209665 A1* | 6/2022 | Li ....................... | H02M 1/0009 |

* cited by examiner

ISOLATED SWITCHING CONVERTER WITH SECONDARY SIDE MODULATION AND CONTROL METHOD THEREOF

CROSS-REFERENCE TO RELATED APPLICATIONS

This application claims the benefit of CN application 202011622595.6 filed on Dec. 31, 2020, and incorporated herein by reference.

TECHNICAL FIELD

The present invention generally relates to electronic circuits, and more particularly but not exclusively to isolated switching converters and control methods thereof.

BACKGROUND

Isolated switching converter usually include a transformer with a primary winding and a secondary winding to provide an isolation. A primary switch is coupled to the primary winding, and controls the energy stored in the primary winding to transfer to the secondary winding. The secondary switch is coupled to the secondary winding. Synchronous rectification is a technology for improving efficiency by replacing a rectifying diode at the secondary side with a secondary switch (a synchronous rectifier such as a power MOSFET). FIG. 1 illustrates waveforms of a synchronous rectification, wherein Vds indicates the drain-source voltage of the secondary switch, Isec indicates a current flowing through the secondary winding, CTRLS indicates the control signal of the secondary switch. The drain-source voltage Vds is compared with two threshold voltage, such as −70 mV and −500 mV. When a body diode of the secondary switch is turned on, the drain-source voltage Vds drops rapidly. The secondary switch is turned on when the drain-source voltage Vds drops below −500 mV. When a primary switch is turned on, the drain-source voltage Vds rises rapidly. The secondary switch is turned off when the drain-source voltage Vds rises up to −70 mV.

The synchronous rectification shown in FIG. 1 turns off the secondary switch after the primary switch is turned on. This may induce shoot through between the primary switch and the secondary switch. Furthermore, because of the characteristic of the secondary switch and delay of the control circuit, there may exist delay to turn off the secondary switch after the drain-source voltage Vds rises to reach −70 mV, which obviously worsen the case. In addition, in high-frequency applications, the switching of the primary switch will cause large switching losses and electromagnetic interference, thereby further affecting the efficiency of the isolated switching converter.

SUMMARY

Embodiments of the present invention are directed to a controller used in an isolated switching converter. The isolated switching converter has a transformer having a primary and secondary winding, a primary switch coupled to the primary winding and a secondary switch coupled to the secondary winding. The controller comprises a valley detection circuit, a pulse frequency modulation circuit, a primary on enable circuit, a primary off detection circuit, a zero cross detection circuit, a secondary logic circuit, an isolation circuit and a primary logic circuit. Wherein the valley detection circuit is coupled to the secondary switch for detecting a resonant voltage of the switching converter and is configured to provide a valley pulse signal in response to one or more valleys of the resonant voltage during off-time of the secondary switch. The pulse frequency modulation circuit is configured to receive a feedback signal indicative of an output voltage of the switching converter and provide a pulse frequency modulation signal. The primary on enable circuit is configured to provide a primary on enable signal, wherein the primary on enable signal is generated based on the pulse frequency modulation signal and the valley pulse signal in quasi-resonant (QR) mode, and the pulse frequency modulation signal is configured as the primary on enable signal in current continuous mode (CCM). The primary off detection circuit configured to detect whether the primary switch is off and generate a primary off detection signal. The zero cross detection circuit is configured to detect whether a current flowing the secondary switch crosses zero and generate a zero cross detection signal. The secondary logic circuit is configured to generate a secondary control signal to control the secondary switch based on the primary off detection signal, the zero cross detection signal and the primary on enable signal. The isolation circuit has an input terminal to receive the primary on enable signal and an output terminal configured to generate a synchronous signal electrically isolated from the primary on enable signal. The primary logic circuit is coupled to the isolation circuit to receive the synchronous signal, wherein based on the synchronous signal, the primary logic circuit generates a primary control signal to control the primary switch.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

In the following descriptions, a flyback converter is used as an example to explain the working principle of the present invention. However, persons skilled in the art can recognize that it is not intended to limit the invention. The present invention may be applied to any other suitable isolated switching converters.

Figure 1:
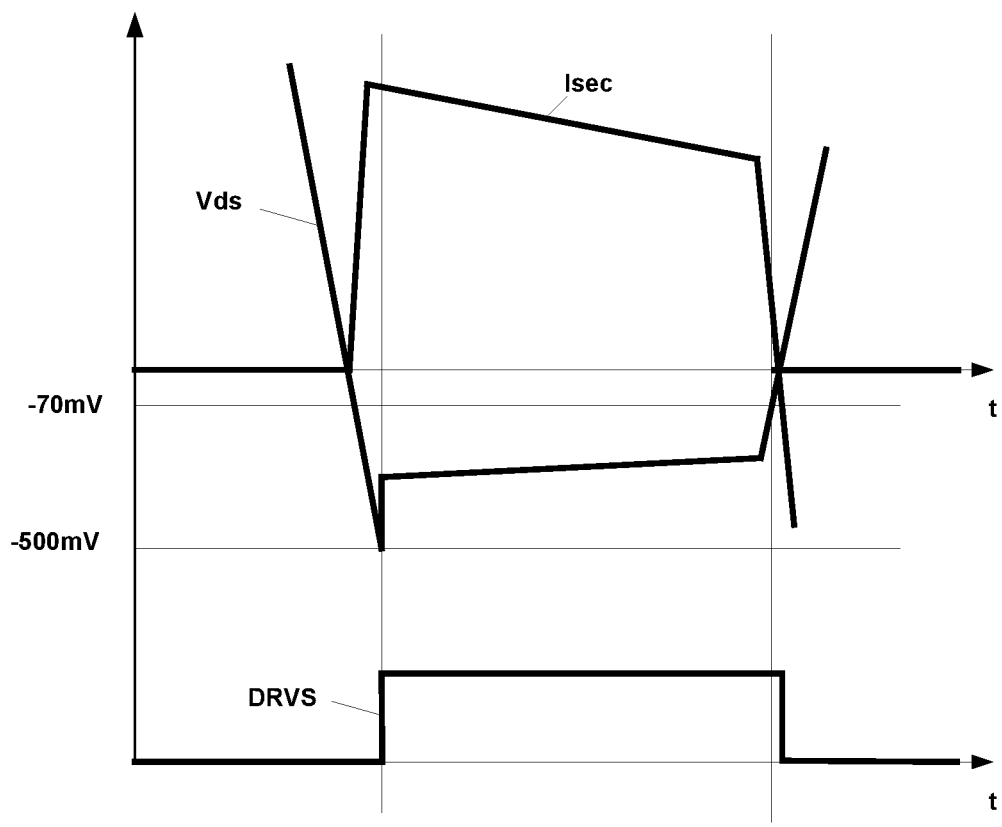
FIG. 1 illustrates waveforms of a synchronous rectification.
Figure 2:
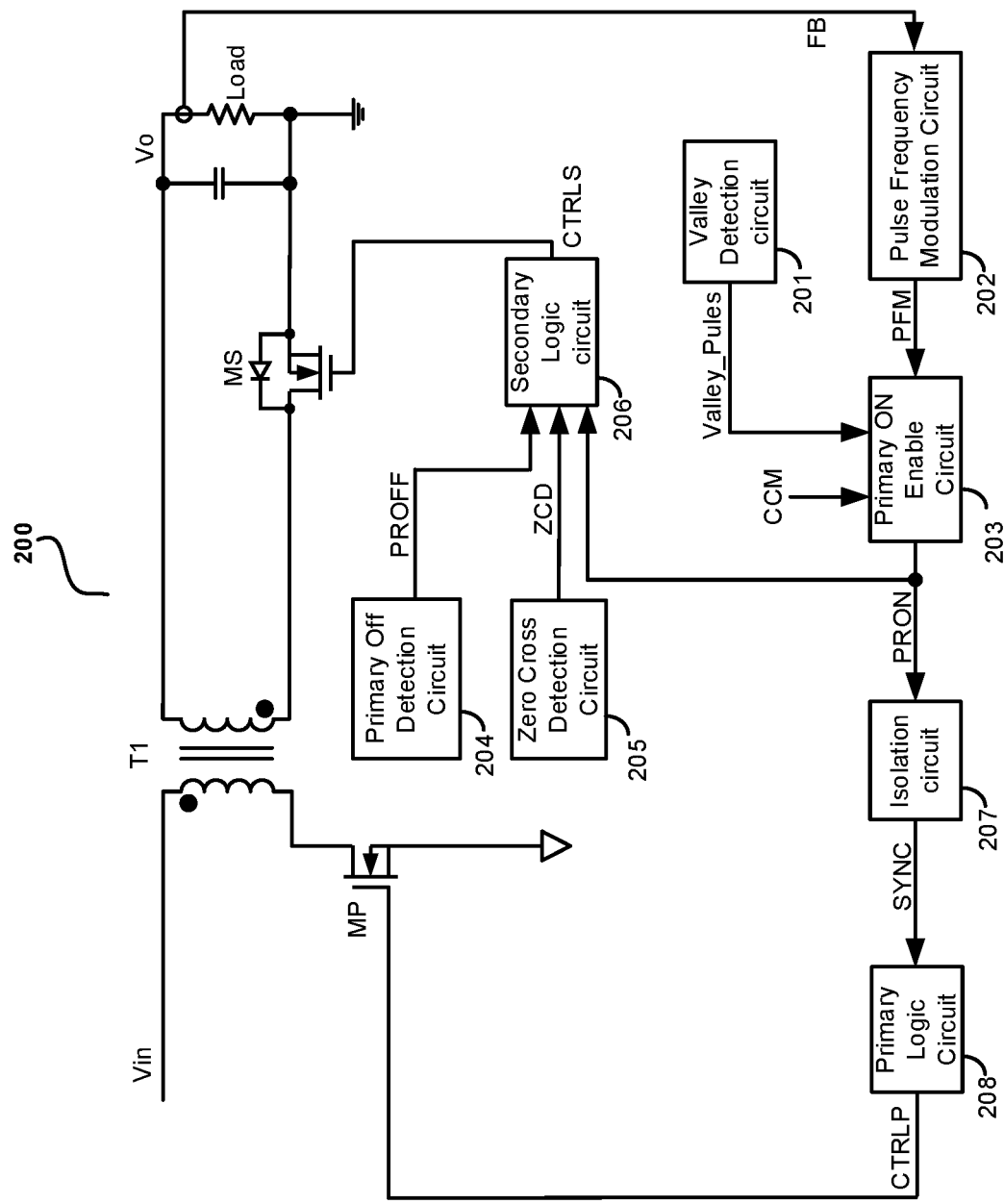
FIG. 2 illustrates a block diagram of an isolated switching converter 200 in accordance with an embodiment of the present invention.

FIG. 2 illustrates a block diagram of an isolated switching converter 200 in accordance with an embodiment of the present invention. The isolated switching converter 200 comprises a transformer T1, a primary switch MP, a secondary switch MS and a controller. The transformer T1 has a primary winding and a secondary winding with each of the windings having a first terminal and a second terminal. The first terminal of the primary winding is configured to receive an input voltage Vin, the second terminal of the secondary winding is coupled to a secondary reference ground. The primary switch MP is coupled between the second terminal of the primary winding and a primary reference ground, the secondary switch MS is coupled between the first terminal of the secondary winding and a load. Persons of ordinary skill in the art can recognize that, the secondary switch MS may also be coupled between the second terminal of the secondary winding and the load.

In the example shown in FIG. 2, quasi-resonant (QR) control is introduced to the control for the isolated switching converter 200. In the QR control, the isolated switching converter 200 works in discontinuous current mode (DCM). When the current flowing through the transformer T1 drops to zero, the parasitic capacitance of the energy storage element and the primary switch MP begins to resonate, and the resonant voltage is generated accordingly. The primary switch MP is turned on when the voltage VDS across the primary switch MP reaches its resonant valley (valley point of the voltage VDS during resonance) which is called valley switching, so as to reduce switching loss and electromagnetic interference.

The controller comprises a valley detection circuit 201, a pulse frequency modulation circuit 202, a primary on enable circuit 203, a primary off detection circuit 204, a zero cross detection circuit 205, a secondary logic circuit 206, an isolation circuit 207 and a primary logic circuit 208. In one embodiment, the controller and the secondary switch is integrated in one chip.

In the isolated switching converter 200 shown in FIG. 2, the valley detection circuit 201 at the secondary side of the transformer to detect the valleys of the resonant voltage. In one embodiment, the valley detection circuit 201 is coupled to the secondary switch MS and is configured to provide a valley pulse signal Valley_Pulse indicative of the valleys of the resonant voltage based on the dynamic resonant voltage waveform. The pulse frequency modulation circuit 202 is configured to receive a feedback signal indicative of an output voltage of the switching converter 200 and provide a pulse frequency modulation signal PFM. The primary on enable circuit 203 is configured to receive a mode signal CCM1, the valley pulse signal Valley_Pulse, and the pulse frequency modulation signal PFM, and provide a primary on enable signal PRON. When the mode signal CCM1 indicates the non-CCM mode, the primary on enable signal PRON is generated based on the pulse frequency modulation signal PFM and the valley pulse signal Valley_Pulse. When the mode signal CCM1 indicates CCM, and the pulse frequency modulation signal PFM is passed to the output terminal as the primary on enable signal PRON.

The primary off detection circuit 204 is configured to detect whether the primary switch MP is off and generate a primary off detection signal PROFF. The primary off detection circuit 204 may detect whether the primary switch MP is off based on the drain-source voltage of the secondary switch MS, the current flowing though the secondary switch MS, the voltage across the secondary winding and so on. The primary off detection circuit 203 may also receive signals indicating whether the primary switch MP is off from the primary side.

The zero cross detection circuit 205 is configured to detect whether the current flowing through the secondary switch MS crosses zero and generate a zero cross detection signal ZCD. The secondary logic circuit 206 has a first input terminal, a second input terminal, a third input terminal and an output terminal, wherein the first input terminal is coupled to the primary off detection circuit 204 to receive the primary off detection signal PROFF, the second input terminal is coupled to the zero cross detection circuit 205 to receive the zero cross detection signal ZCD, the third input terminal is coupled to the primary on enable circuit 203 to receive the primary on enable signal PRON. The secondary logic circuit 206 generates the secondary control signal CTRLS for controlling the secondary switch MS based on the primary off detection signal PROFF, the zero cross detection signal ZCD and the primary on enable signal PRON.

The isolation circuit 207 has an input terminal and an output terminal, wherein the input terminal is coupled to the output terminal of the primary on enable circuit 203 to receive the primary on enable signal PRON. Based on the primary on enable signal PRON, the isolation circuit 202 generates a synchronous signal SYNC electrically isolated from the primary on enable signal PRON at the output terminal. The isolation circuit 207 may comprise an optocoupler, a transformer, a capacitor or other suitable electrical isolators. In some embodiments, the isolation circuit 207 may be located outside of the controller IC.

The primary logic circuit 208 has an input terminal and an output terminal, wherein the input terminal is coupled to the output terminal of the isolation circuit 207 to receive the synchronous signal SYNC. Based on the synchronous signal SYNC, the primary logic circuit 208 generates a primary control signal CTRLP to control the primary switch MP at the output terminal.

In QR mode, the secondary logic circuit 206 will turn off the secondary switch MS if a zero cross of the current flowing through the secondary switch MS is detected. In CCM mode, the secondary logic circuit 206 will turn off the secondary switch MS on the rising edge of the primary on enable signal PRON. Furthermore, the secondary switch MS is turned on based on the primary on enable signal PRON. Regardless of the quasi-resonant control in the non-current continuous mode or the current continuous mode, switching between the primary switch MP and the secondary switch MS can be precisely controlled, and shoot through is avoided.

In some embodiments, to ensure the primary switch MP is turned on after the secondary switch MS is off, a delay circuit is coupled between the primary on enable circuit 203 and the isolation circuit 207, or coupled between the isolation circuit 207 and the primary logic circuit 208.

Figure 3:
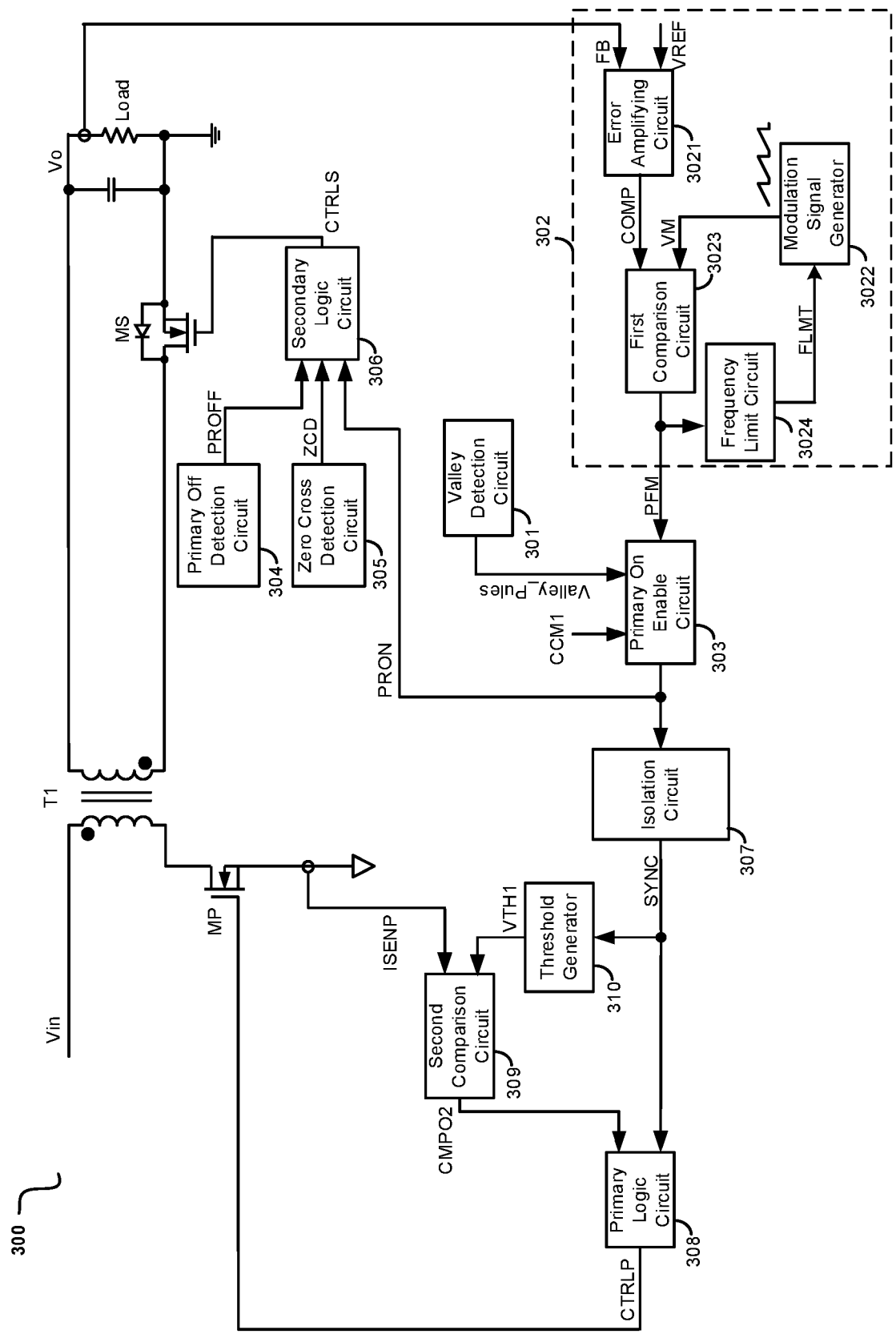
FIG. 3 illustrates a block diagram of an isolated switching converter 300 in accordance with an embodiment of the present invention.

FIG. 3 illustrates a block diagram of an isolated switching converter 300 in accordance with an embodiment of the present invention. In the example shown in FIG. 3, the pulse frequency modulation circuit 302 comprises an error amplifying circuit 3021, a modulation signal generator 3022 and a first comparison circuit 3023. The error amplifying circuit 206 has a first input terminal, a second input terminal and an output terminal, wherein the first input terminal is configured to receive a feedback signal FB indicative of the output voltage of the isolated switching converter, the second input terminal is configured to receive a reference signal VREF. Based on the difference between the reference signal VREF and the feedback signal FB, the error amplifying circuit 3021 generates a compensation signal COMP at the output terminal. The modulation signal generator 3022 is configured to generate a modulation signal VM which may be a saw tooth signal, a triangular signal or any other suitable signals. The first comparison circuit 3023 has a first input terminal, a second input terminal and an output terminal, wherein the first input terminal is coupled to the output terminal of the error amplifying circuit 3021 to receive the compensation signal COMP, the second input terminal is coupled to the modulation signal generator 3022 to receive the modulation signal VM. The first comparison circuit 3023 compares the compensation signal COMP with the modulation signal VM and generates the pulse frequency modulation signal PFM at the output terminal.

In some embodiments, a frequency limit circuit 3024 is coupled between the output terminal of the first comparison circuit 3023 and the modulation signal generator 3024 to limit the switching frequency of the switching converter 300. The frequency limit circuit 3024 has an input terminal and an output terminal, wherein the input terminal is coupled to the first comparison circuit 3023 to receive the pulse frequency modulation signal PFM, the output terminal is coupled to the modulation signal generator 3024. Based on the pulse frequency modulation signal PFM, the frequency limit circuit 3024 generates a frequency limit signal FLMT at the output terminal to limit the frequency of the modulation signal VM.

Compared with the switching converter 200 shown in FIG. 2, the switching converter 300 further comprises a second comparison circuit 309. The second comparison circuit 309 has a first input terminal, a second input terminal and an output terminal, wherein the first input terminal is configured to receive a primary current sensing signal ISENP indicative of the current flowing through the primary switch MP, the second input terminal is configured to receive a first threshold voltage VTH1. The second comparison circuit 309 compares the primary current sensing signal ISENP with the first threshold voltage VTH1 and generates a second comparison signal CMPO2 at the output terminal. The primary logic circuit 308 is coupled to the output terminal of the second comparison circuit 309, and is configured to generate the primary control signal CTRLP based on the synchronous signal SYNC and the second comparison signal CMPO2. The first threshold voltage VTH1 may be a constant value or a variable value varying with the synchronous signal SYNC. In an embodiment, the switching converter 300 further comprises a threshold generator 310. The threshold generator 310 has an input terminal and an output terminal, wherein the input terminal is coupled to the isolation circuit 307 to receive the synchronous signal SYNC, the output terminal is couple to the second input terminal of the second comparison circuit 309. Based on the synchronous signal SYNC, the threshold generator 310 generates the first threshold voltage VTH1 at the output terminal.

Figure 4:
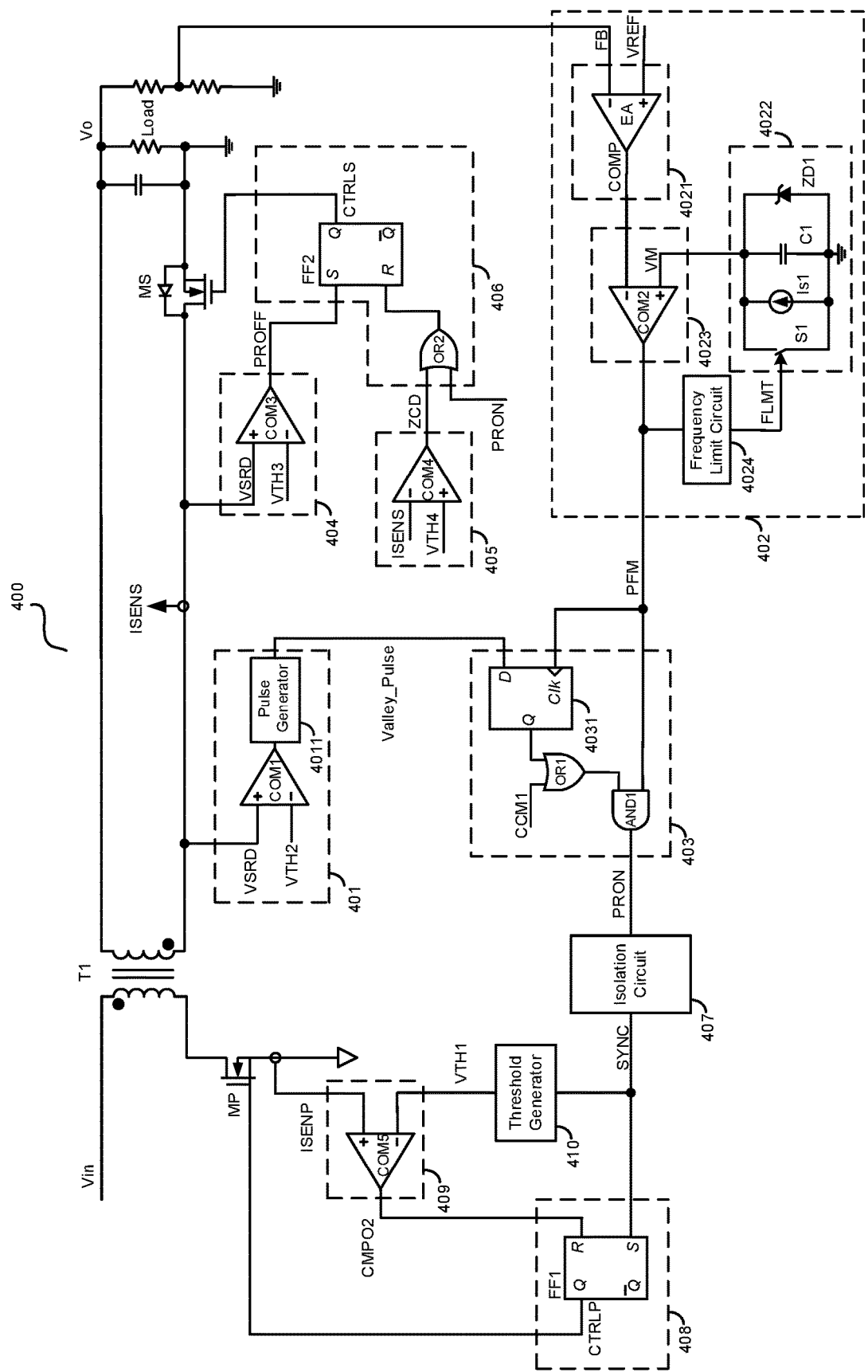
FIG. 4 schematically illustrates an isolated switching converter 400 in accordance with an embodiment of the present invention.

FIG. 4 schematically illustrates an isolated switching converter 400 in accordance with an embodiment of the present invention. In the example shown in FIG. 4, the valley detection circuit 401 comprises a comparator COM1 and a pulse generator 4011. The comparator COM1 has a non-inverting input terminal, an inverting input terminal and an output terminal, wherein the non-inverting input terminal is configured to receive a drain voltage VSRD of the secondary switch MS, the inverting input terminal is configured to receive a second threshold voltage VTH2, and the output terminal is coupled to an input terminal of the pulse generator 4011. The pulse generator 4011 provides the valley pulse signal Valley_Pulse at its output terminal.

In the example shown in FIG. 4, the pulse frequency modulation circuit 402 comprises the error amplifying circuit 4021, the modulation signal generator 4022, the first comparison circuit 4023 and the frequency limit circuit 4024.

The error amplifying circuit 4021 comprises an error amplifier EA. The non-inverting input terminal of the error amplifier EA is configured to receive the feedback signal FB indicative of the output voltage Vout of the switching converter, the inverting input terminal is configured to receive the reference signal VREF, the output terminal is coupled to the first comparison circuit 4023 to provide the compensation signal COMP.

The modulation signal generator 4022 comprises a capacitor C1, a switch S1 and a current source Is1. The capacitor C1 has a first terminal and a second terminal, wherein the first terminal is coupled to the first comparison circuit 4023 to provide the modulation signal VM, the second terminal is coupled to the secondary reference ground. The switch S1 has a first terminal, a second terminal and a control terminal, wherein the first terminal is coupled to the first terminal of the capacitor C1, the second terminal is coupled to the secondary reference ground, the control terminal is coupled to the output terminal of the first comparison circuit 4023 through the frequency limit circuit 4024. The current source Is1 has an input terminal and an output terminal, wherein the input terminal is coupled to the secondary reference ground, the output terminal is coupled to the first terminal of the capacitor C1. In one embodiment, the modulation signal generator 4022 further comprises a Zener diode ZD1. The anode of the Zener diode ZD1 is coupled to the secondary reference ground, the cathode is coupled to the first terminal of the capacitor C1.

The first comparison circuit 4023 comprises a comparator COM2. The non-inverting input terminal of the comparator COM2 is coupled to the modulation signal generator 4022 to receive the modulation signal VM, the inverting input terminal is coupled to the error amplifying circuit 4021 to receive the compensation signal COMP, the output terminal is coupled to the primary on enable circuit 403 to provide the pulse frequency modulation signal PFM.

The primary on enable circuit 403 comprises a D flip-flop 4031, an OR gate OR1 and an AND gate AND1. The D flip-flop 4031 has an input terminal, an clock terminal and an output terminal, wherein the input terminal is coupled to the output terminal of the valley detection circuit 401 to receive the valley pulse signal Valley_Pulse, the clock terminal is coupled to the output terminal of the pulse frequency modulation circuit 402 to receive the pulse frequency modulation signal PFM, the output terminal is coupled to a first input terminal of the OR gate OR1. A second input terminal of the OR gate OR1 is configured to receive the mode signal CCM1, an output terminal of the OR gate OR1 is coupled to a first input terminal of the AND gate AND1. A second input terminal of the AND gate AND2 is configured to receive the pulse frequency modulation signal PFM, an output terminal of the AND gate AND2 is coupled to the isolation circuit 407 and the secondary logic circuit 406 respectively for providing the primary on enable signal PRON.

The primary off detection circuit 404 comprises a comparator COM3. The non-inverting input terminal of the comparator COM3 is configured to receive the drain voltage VSRD of the secondary switch MS, the inverting input terminal is configured to receive a third threshold voltage VTH3, the output terminal is coupled to the secondary logic circuit 406 to provide the primary off detection signal PROFF. The zero cross detection circuit 405 comprises a comparator COM4. The non-inverting input terminal of the comparator COM4 is configured to receive a fourth threshold voltage VTH4, the inverting input terminal is configured to receive a secondary current sensing signal ISENS indicative of the current flowing through the secondary switch MS, the output terminal is coupled to the secondary logic circuit 406 to provide the zero cross detection signal ZCD. In some embodiments, when the zero cross detection circuit 405 detects that the drain voltage VSRD of the secondary switch MS changes from a negative voltage to a positive voltage, the zero cross detection signal ZCD changes from a low level to a high level to turn off the secondary switch MS.

The secondary logic circuit 406 comprises an OR gate OR2 and a flip-flop FF2. The OR gate OR2 has a first input terminal, a second input terminal and an output terminal, wherein the first input terminal is coupled to the zero cross detection circuit 405 to receive the zero cross detection signal ZCD, the second input terminal is coupled to the primary on enable circuit 403 to receive the primary on enable signal PRON. The flip-flop FF2 has a set terminal, a reset terminal and an output terminal, wherein the set terminal is coupled to the output terminal of the primary off detection circuit 403 to receive the primary off detection signal PROFF, the reset terminal is coupled to the output terminal of the OR gate OR2, the output terminal is coupled to the gate terminal of the secondary switch MS to provide the secondary control signal CTRLS.

The primary logic circuit 408 comprises a flip-flop FF1 having a set terminal, a reset terminal and an output terminal. The set terminal of the flip-flop FF1 is coupled to the output terminal of the isolation circuit 407 to receive the synchronous signal SYNC, the reset terminal is coupled to the output terminal of the second comparison circuit 409 to receive the second comparison signal CMPO2, the output terminal is coupled to the gate terminal of the primary switch MP to provide the primary control signal CTRLP. The second comparison circuit 409 comprises a comparator COM5. The non-inverting input terminal of the comparator COM5 is configured to receive the primary current sensing signal ISENP, the inverting input terminal is coupled to the threshold generator 410 to receive the first threshold voltage VTH1, the output terminal is coupled to the primary logic circuit 408 to provide the second comparison signal CMPO2.

Figure 5:
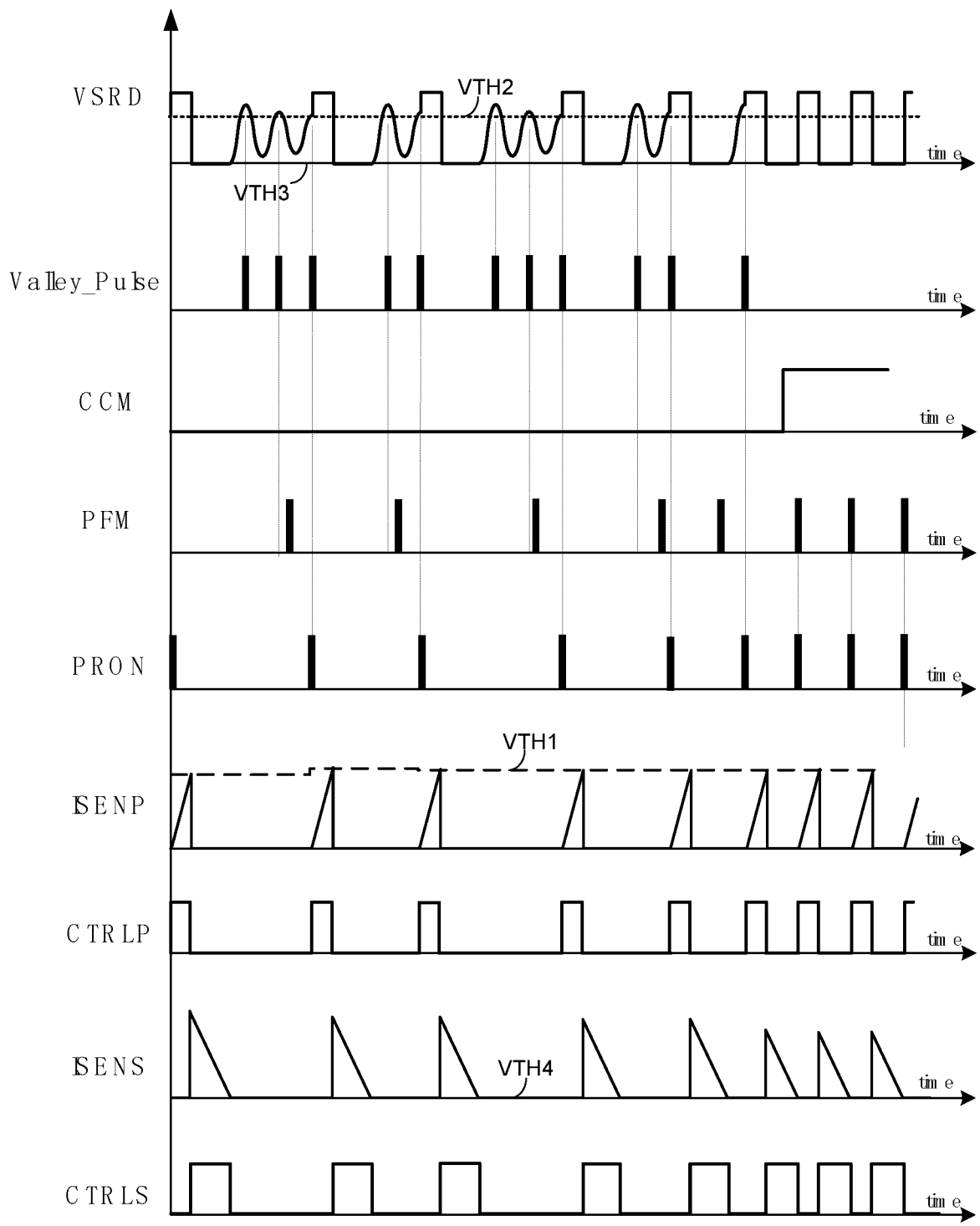
FIG. 5 illustrates waveforms of the isolated switching converter 400 in accordance with an embodiment of the present invention.

FIG. 5 illustrates waveforms of the isolated switching converter 400 in accordance with an embodiment of the present invention. As shown in FIG. 5, during the off-time of the secondary switch MS, when the drain voltage VSRD of the secondary switch MS is higher than the second threshold voltage VTH2, the valley detection circuit 401 provides the valley pulse signal Valley_Pulse. The number of pulses of the valley pulse signal Valley_Pulse depends on the number of valleys of the resonant voltage waveform during the off-time of the secondary switch MS.

When the mode signal CCM1 is at the low level, the switching converter 400 works in QR mode. When the next valley pulse comes after the rising edge of the pulse frequency modulation signal PFM, the primary on enable signal PRON is asserted and changes from the low level to the high level.

At almost the same time, the synchronous signal SYNC outputted by the isolation circuit 407 is also changed from the low level into the high level, the flip-flop FF1 is set. The primary control signal CTRLP is changed from the low level into the high level and the primary switch MP is turned on. The primary current sensing signal ISENP as well as the current flowing through the primary switch MP starts increasing. When the primary current sensing signal ISENP increases to reach the first threshold voltage VTH1, the flip-flop FF1 is reset. The primary control signal CTRLP is changed from the high level into the low level and the primary switch MP is turned off. After the primary switch MP being turned off, the drain voltage VSRD of the secondary switch MS is changed from positive into negative and becomes less than the third threshold voltage VTH3. The flip-flop FF2 is set, the secondary control signal CTRLS is changed from the low level into the high level and the secondary switch MS is turned on.

The current transfers to the secondary side from the primary side of the transformer T1, the secondary current sensing signal ISENS as well as the current flowing through the secondary switch MS start decreasing. When the secondary current sensing signal ISENS decreases to reach the fourth threshold voltage VTH4, the flip-flop FF2 is reset. The secondary control signal CTRLS is changed from the high level into the low level and the secondary switch MS is turned off. When the current flowing through the transformer T1 drops to zero, the transformer T1 and the parasitic capacitance begins to resonate, and the resonant voltage is generated accordingly. The valley detection circuit 401 is coupled to the secondary switch MS to detect the valleys of the resonant voltage waveform signal and provides the valley pulse signal Valley_Pulse. The above process keeps repeating until the mode signal CCM1 changes from the low level to the high level.

When the mode signal CCM1 changes from the low level to the high level, the switching converter 400 enters the current continuous mode (CCM). The primary on enable circuit 403 is configured to allow the pulse frequency modulation signal PFM to be outputted as the primary on enable signal PRON. The secondary switch MS is turned off at the rising edge of the primary on enable signal PRON. When the rising edge of the primary on enable signal PRON comes, at the almost same time, the synchronous signal SYNC outputted by the isolation circuit 407 is also changed from the low level into the high level, and the primary control signal CTRLP changes from the low level to the high level, the primary switch MP is turned on. When the primary current sensing signal ISENP increases to reach the first threshold voltage VTH1, the primary switch MP is turned off. After the primary switch MP being turned off, the drain voltage VSRD of the secondary switch MS is changed from positive into negative, and the secondary switch MS is turned on. The above process keeps repeating until the mode signal CCM1 changes from the high level to the low level.

Figure 6:
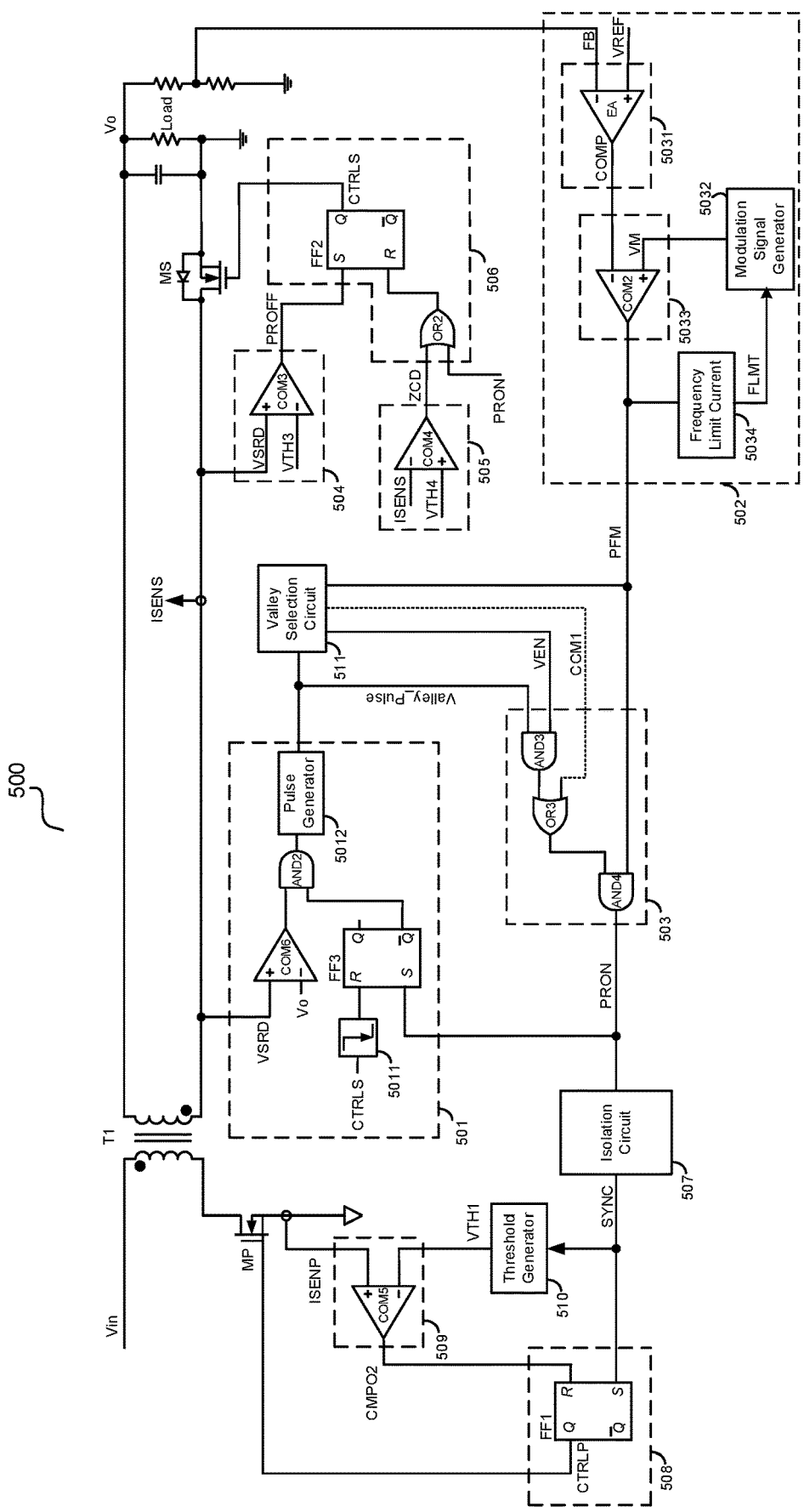
FIG. 6 schematically illustrates an isolated switching converter 500 in accordance with an embodiment of the present invention.

FIG. 6 schematically illustrates an isolated switching converter 500 in accordance with an embodiment of the present invention. In the example shown in FIG. 6, the controller further comprises a valley selection circuit 511. The valley selection circuit 511 has a first input terminal, a second input terminal and an output terminal, wherein the first input terminal is configured to receive the valley pulse signal Valley_Pulse, the second input terminal is configured to receive the pulse frequency modulation signal PFM, the valley selection circuit 511 generates a target valley number VALLEY_LOCK(n) based on the pulse frequency modulation signal PFM and a last-cycle valley number VALLEY_LOCK(n−1), and provides a valley enable signal VEN corresponding to the target valley number VALLEY_LOCK(n).

In one embodiment, the number of pulses of the valley pulse signal Valley_Pulse is counted during the period from when the secondary switch MS is turned off to the rising edge of the pulse frequency modulation signal PFM, and the counted number is compared with the last-cycle valley number VALLEY_LOCK(n−1), wherein based on the comparison result, the target valley number VALLEY_LOCK(n) is determined to keep the last-cycle valley number VALLEY_LOCK(n−1) unchanged or switch to another valley number.

In another embodiment, the valley selection circuit 511 has a second output terminal to provide the mode signal CCM1 based the target valley number VALLEY_LOCK(n). Wherein when the target valley number VALLEY_LOCK(n)=0, the mode signal CCM1 has a high level indicating CCM.

In the example of FIG. 6, the valley detection circuit 501 comprises a valley comparator COM6, a falling edge trigger circuit 5011, a flip-flop FF3, a AND gate AND2 and a pulse generator 5012. The non-inverting input terminal of the valley comparator COM6 is coupled to the secondary switch MS to receive the drain voltage VSRD of the secondary switch MS. The inverting input terminal of the valley comparator COM6 is configured to receive the output voltage Vo of the switching converter 500. The valley comparator COM6 compares the drain voltage VSRD of the secondary switch MS with the output voltage Vo and provides a valley comparison signal at an output terminal. The flip-flop FF3 has a set terminal, a reset terminal and an inverting output terminal, wherein the set terminal is configured to receive the primary on enable signal PRON, the reset terminal is configured to receive the secondary control signal CTRLS through the falling edge trigger circuit 5011. The AND gate AND2 has a first input terminal, a second input terminal and an output terminal, wherein the first input terminal is coupled to the output terminal of the valley comparator COM6 to receive the valley comparison signal, the second input terminal is coupled to the inverting output terminal if the flip-flop FF3. The pulse generator 5012 has an input terminal and an output terminal, wherein the input terminal is coupled to the output terminal of the AND gate AND2, the pulse generator 5012 provides the valley pulse signal Valley_Pulse at the output terminal.

In the example of FIG. 6, the primary on enable circuit 503 comprises an AND gate AND3, an OR gate OR3 and an AND gate AND4. The AND gate AND3 receives the valley pulse signal Valley_Pulse and the valley enable signal VEN and has an output terminal coupled to a first input terminal of the OR gate OR3. A second input terminal of the OR gate OR3 is configured to receive the mode signal CCM1 provided by the valley selection circuit 511. An output terminal of the OR gate OR3 is coupled to a first input terminal of the AND gate AND4. A second input terminal of the AND gate AND4 is configured to receive the pulse frequency modulation signal PFM, an output terminal of the AND gate AND2 is coupled to the isolation circuit 507 and the secondary logic circuit 506 respectively for providing the primary on enable signal PRON.

Figure 7:
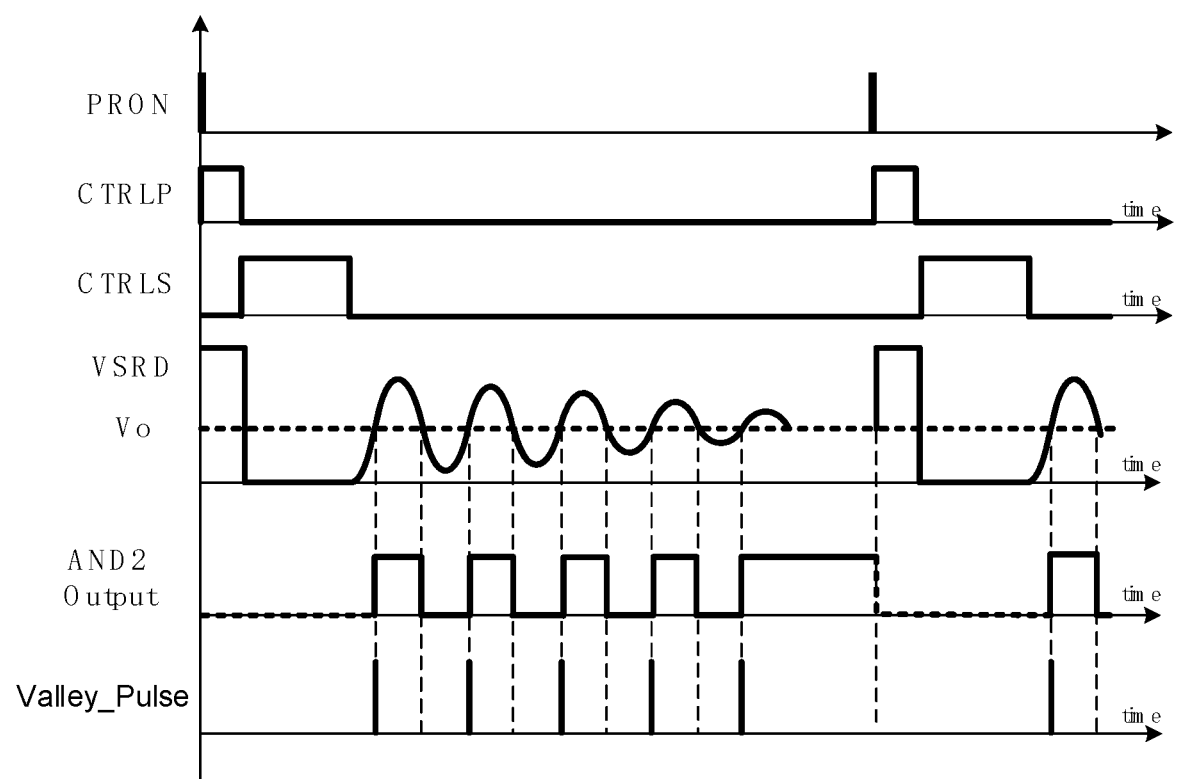
FIG. 7 illustrates waveforms of the valley detection circuit shown in FIG. 6 in accordance with an embodiment of the present invention.

FIG. 7 illustrates waveforms of the valley detection circuit 501 shown in FIG. 6 in accordance with an embodiment of the present invention. As shown in FIG. 7, when the primary on enable signal PRON is asserted, the primary control signal CTRLP changes from the low level to the high level, the flip-flop FF3 is set, the inverting output terminal of the flip-flop FF3 changes from the high level to the low level. The valley comparison signal is blocked by the AND gate AND2. When the secondary control signal CTRLS changes from the high level to the low level, the secondary switch MS is turned off, the flip-flop FF3 is reset, the inverting output terminal of the flip-flop FF3 changes from the low level to the high level. The valley comparison signal is allowed to pass the AND gate AND2, the output of the AND gate AND2 is provided to the pulse generator 5012. The pulse generator 5012 generates the valley pulse signal Valley_pulse with a preset pulse width at each rising edge of the valley comparison signal. In some embodiments, in order to ensure that the primary switch MP is turned on at the valley point, a small delay circuit is coupled between the AND gate AND2 and the pulse generator 5012.

Figure 8:
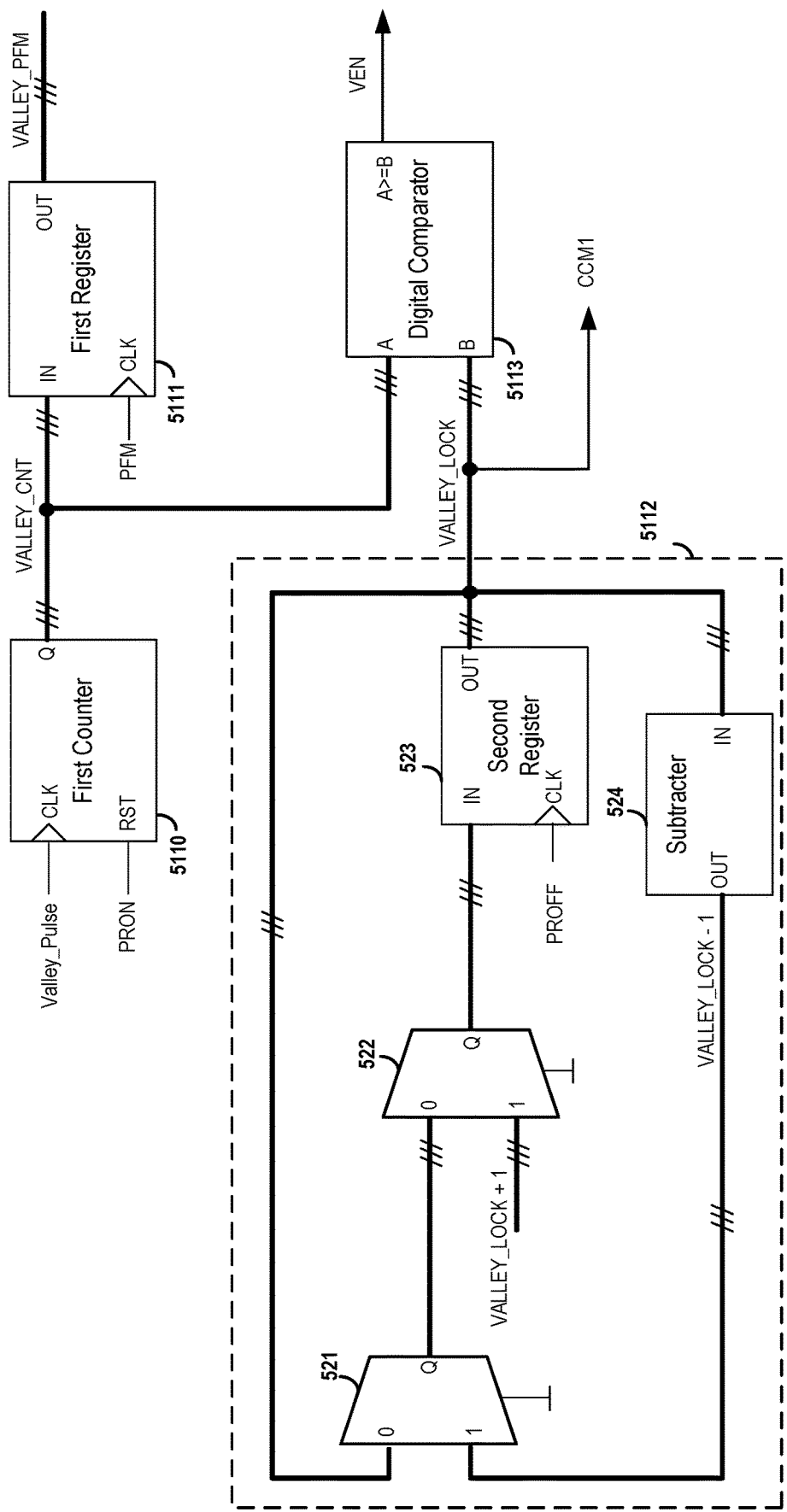
FIG. 8 schematically illustrates a valley selection circuit 511 in accordance with an embodiment of the present invention.

FIG. 8 schematically illustrates the valley selection circuit 511 shown in FIG. 6 in accordance with an embodiment of the present invention. The valley selection circuit 511 comprises a first counter 5110, a first register 5111, a target valley number generator 5112 and a digital comparator 5113. The first counter 5110 has a clock terminal, a reset terminal and an output terminal, wherein the clock terminal is configured to receive the valley pulse signal Valley_Pulse, the reset terminal is configured to receive the primary on enable signal PRON. The first counter 5110 starts counting the number of pulses of the valley pulse signal at the beginning of the each switching cycle, and outputs a first count VALLEY_CNT at the output terminal. In one embodiment, the first counter 5110 starts counting the number of pulses of the valley pulse signal when the primary on enable signal PRON is asserted. The first register 5111 has an input terminal, a clock terminal, and an output terminal, wherein the input terminal is configured to receive the first count VALLEY_CNT, the clock terminal is configured to receive the pulse frequency modulation signal PFM. The first register 5111 outputs a second count VALLEY_PFM at the output terminal during the period from the beginning of each switching cycle to when the rising edge of the pulse frequency modulation signal PFM arrives. In one embodiment, the second register 5111 outputs the second count VALLEY_PFM by counting the number of pulses of the valley pulse signal Valley_Pulse during the period from when the secondary switch is turned off to when the the rising edge of the pulse frequency modulation signal PFM arrives. The target valley generator 5112 compares the second count VALLEY_PFM and the last-cycle valley number VALLEY_LOCK (n−1) and provides the target valley number VALLEY_LOCK(n) at the output terminal based on the comparison result. The digital comparator 5113 compares the first count VALLEY_CNT with the target valley number VALLEY_LOCK(n), wherein when the first count VALLEY_CNT becomes greater than or equal to the target valley number VALLEY_LOCK(n), the digital comparator 5113 provides a valley enable signal VEN at the output terminal.

When the target valley number VALLEY_LOCK(n) is determined to be zero, the mode signal CCM1 provided by the valley selection circuit 511 changes from the low level to the high level, indicating that the switching converter enters CCM.

In the example shown in FIG. 8, the target valley number generator 5112 comprises a first multiplexer 521, a second multiplexer 522, a second register 523 and a subtracter 524. In other embodiment, the target valley number generator 5112 can be constructed by other digital circuits.

When the primary switch MP is turned off, or when the rising edge of the primary off detection signal PROFF comes, the target valley number generator 5112 provides the updated target valley number VALLEY_LOCK(n) at the output terminal of the second register 523.

When the second count VALLEY_PFM is greater than the last-cycle valley number VALLEY_LOCK(n−1), the target valley number can be generated based on VALLEY_LOCK(n)=VALLEY_LOCK(n−1)+1. In one embodiment, when the last-cycle valley number VALLEY_LOCK(n−1) is greater than 3 and is greater the second value VALLEY_PFM by 2, the target valley number can be generated based on VALLEY_LOCK(n)=VALLEY_LOCK(n−1)−1. In addition, when the last-cycle valley number VALLEY_LOCK(n−1) is 1 or 2, and when the rising edge of the pulse frequency modulation signal PFM is a preset time earlier than a first pulse of the valley pulse signal Valley_Pulse in each switching cycle, the target valley number can be generated based on VALLEY_LOCK(n)=VALLEY_LOCK(n−1)−1. In other conditions, the target valley number VALLEY_LOCK(n) can remain unchanged, which is equal to the last-cycle valley number VALLEY_LOCK(n−1).

In CCM, the primary ON enable circuit 503 allow the pulse frequency modulation signal PFM to pass and to be outputted at the output terminal as the primary on enable signal PRON. While in QR mode, when the valley enable signal VEN is asserted and when the rising edge of the pulse frequency modulation signal PFM comes, the primary on enable circuit 503 outputs the asserted primary on enable signal PRON for controlling the primary switch MP to turn on.

Figure 9:
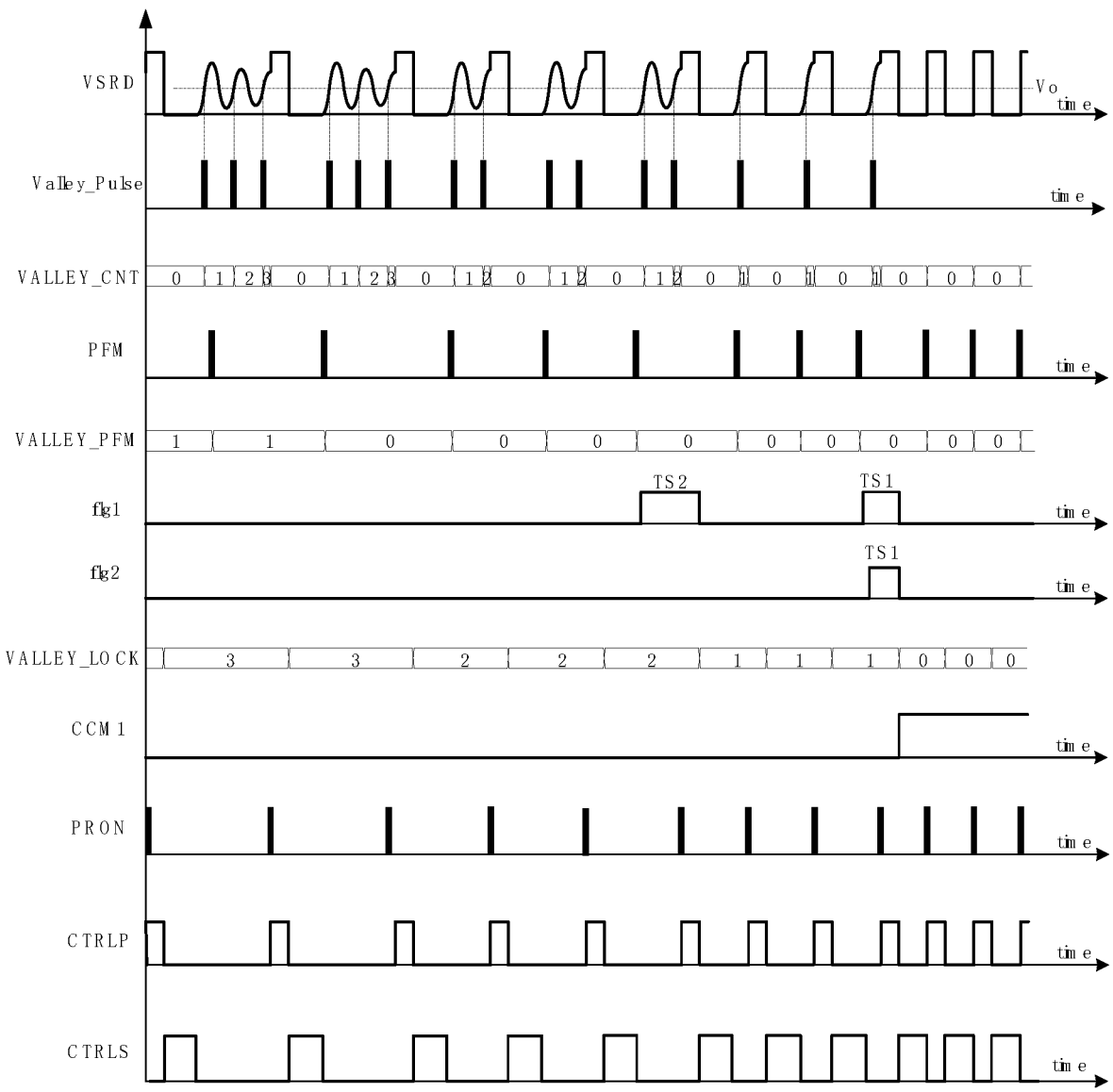
FIG. 9 illustrates waveforms of the isolated switching converter 500 shown in FIG. 6 in accordance with an embodiment of the present invention.

FIG. 9 illustrates waveforms of the isolated switching converter 500 shown in FIG. 6 in accordance with an embodiment of the present invention.

When the mode signal CCM1 is at the low level, during each off-time of the secondary switch MS, the valley detection circuit 501 generates the valley pulse signal Valley_Pulse based on the comparison between the drain voltage VSRD of the secondary switch MS and the output voltage Vo. The first counter 5110 is configured to start counting the number of pulses of the valley pulse signal Valley_Pulse from when the first switch MP is turned on in each switching cycle, and provides the first count VALLEY_CNT as the output terminal. The first register 5111 records the number of pulses of the valley pulse signal Valley_Pulse during the period from when the first switch is turned on to when the rising edge of the pulse frequency modulation signal PFM comes, and provides the second count VALLEY_PFM. Based on the control principle of the target valley number generator 5112, the target valley number VALLEY_LOCK(n) is determined and generated. And the primary switch MP is turned on based on the primary control signal CTRLP corresponding to the primary on enable signal PRON provided by the primary on enable circuit 503.

When the mode signal CCM1 changes the high level from the low level, the pulse frequency modulation signal PFM is used as the primary on enable signal PRON to control the primary switch MP to turn on.

In addition, when the last-cycle valley number VALLEY_LOCK(n−1) is 1, and when the rising edge of the pulse frequency modulation signal PFM is a first preset time TS1 earlier than the first pulse of the valley pulse signal Valley_Pulse, the target valley number VALLEY_LOCK(n)=0.

In addition, when the last-cycle valley number VALLEY_LOCK(n−1) is 2, and when the rising edge of the pulse frequency modulation signal PFM is a second preset time TS2 earlier than the first pulse of the valley pulse signal Valley_Pulse, the target valley number VALLEY_LOCK(n)=1.

The above embodiments all relate to an isolated switching converter that can work in both CCM mode and QR operation in non-CCM mode. The embodiments of the present invention can be applied to an isolated switching converter that only adopts QR control with only slight changes.

Figure 10:
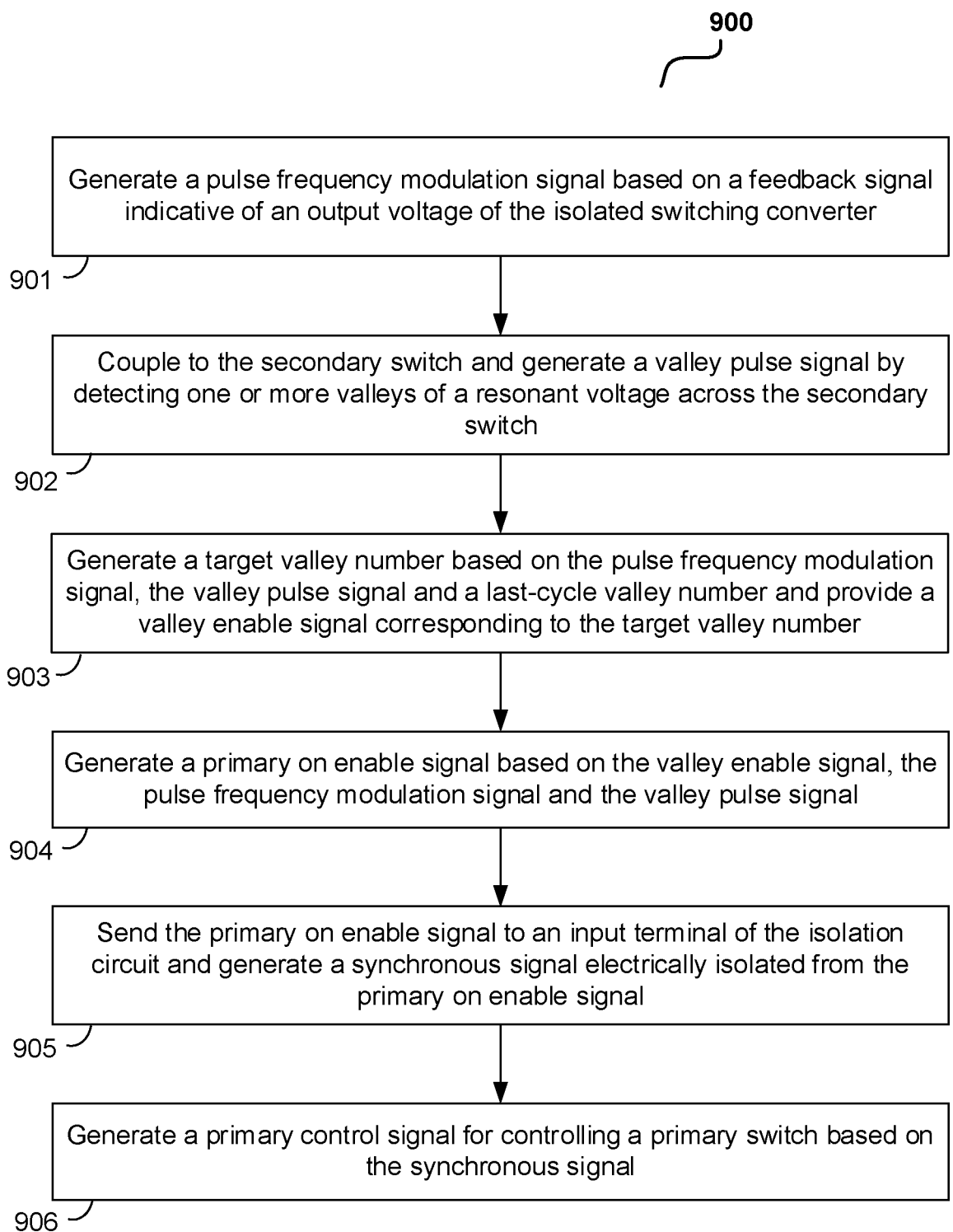
FIG. 10 illustrates workflow of a control method 900 for an isolated switching converter with quasi-resonant operation in accordance with an embodiment of the present invention.

FIG. 10 illustrates workflow of a control method 900 for an isolated switching converter with quasi-resonant operation in accordance with an embodiment of the present invention. The switching converter comprises a transformer having a primary winding and a secondary winding, a primary switch coupled to the primary winding and a secondary switch coupled to the secondary winding, the control method comprises steps 901~906.

At step 901, a pulse frequency modulation signal is generated based on a feedback signal indicative of an output voltage of the isolated switching converter.

At step 902, a valley pulse signal is generated by detecting one or more valleys of a resonant voltage across the secondary switch.

At step 903, a target valley number is generated based on the pulse frequency modulation signal and a last-cycle valley number and a valley enable signal corresponding to the target valley number is provided. In one embodiment, the number of pulses of the valley pulse signal is counted during the period from when the primary switch is turned on to when the rising edge of the pulse frequency modulation signal arrives, and the target valley number is determined based on the comparison between the counted number and the last-cycle valley number, to keep the last-cycle valley number unchanged or switch to another valley number.

In one embodiment, the step 903 further comprises: starting counting the number of pulses of the valley pulse signal when the primary switch is turned on and outputting a first count; recording the number of pulses of the valley pulse signal during the period from when the primary switch is turned on to when the rising edge of the pulse frequency modulation signal arrives, and outputting a second count; comparing the second count with the last-cycle valley number and providing the target valley number; and providing the valley enable signal by comparing the first count and the target valley number, when the first count becomes greater than or equal to the target valley number, the valley enable signal is asserted.

At step 904, a primary on enable signal is generated based on the valley enable signal, the pulse frequency modulation signal and the valley pulse signal.

At step 905, the primary on enable signal is sent to the isolation circuit, and the isolation circuit provides a synchronous signal, which is electrically isolated from the primary on enable signal.

At step 906, a primary control signal is generated based on the synchronous signal.

The control method 900 further comprises: a primary off detection signal is generated by detecting whether the primary switch is turned off; a zero cross detection signal is generated by detecting whether the current flowing through the secondary switch crosses zero; and a secondary control signal for controlling the secondary switch is generated based on the primary off detection signal and the zero cross detection signal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A controller used in an isolated switching converter, wherein the isolated switching converter has a transformer having a primary and secondary winding, a primary switch coupled to the primary winding and a secondary switch coupled to the secondary winding, the controller comprises:
   a valley detection circuit coupled to the secondary switch for detecting a resonant voltage of the switching converter and configured to provide a valley pulse signal in response to one or more valleys of the resonant voltage;
   a pulse frequency modulation circuit configured to receive a feedback signal indicative of an output voltage of the switching converter and to provide a pulse frequency modulation signal;
   a primary on enable circuit configured to provide a primary on enable signal, wherein the primary on enable signal is generated based on the pulse frequency modulation signal and the valley pulse signal in quasi-resonant (QR) mode, and the pulse frequency modulation signal is configured as the primary on enable signal in current continuous mode (CCM);
   a primary off detection circuit configured to detect whether the primary switch is off and generate a primary off detection signal;
   a zero cross detection circuit configured to detect whether a current flowing the secondary switch crosses zero and generate a zero cross detection signal;
   a secondary logic circuit configured to generate a secondary control signal to control the secondary switch based on the primary off detection signal, the zero cross detection signal and the primary on enable signal;
   an isolation circuit having an input terminal to receive the primary on enable signal and an output terminal configured to generate a synchronous signal electrically isolated from the primary on enable signal; and
   a primary logic circuit coupled to the isolation circuit to receive the synchronous signal, wherein based on the synchronous signal, the primary logic circuit generates a primary control signal to control the primary switch.

2. The controller of claim 1, the pulse frequency modulation circuit comprising:
   an error amplifying circuit configured to generate a compensation signal based on the difference between a reference signal and the feedback signal;
   a modulation signal generator configured to generate a modulation signal; and
   a first comparison circuit coupled to the error amplifying circuit and the modulation signal generator, wherein the first comparison circuit compares the compensation signal with the modulation signal and generates the pulse frequency modulation signal.

3. The controller of claim 1, wherein the primary on enable circuit comprising:
   a D flip-flop having an input terminal, a clock terminal and an output terminal, wherein the input terminal is coupled to receive the valley pulse signal, the clock terminal is coupled to receive the pulse frequency modulation signal;
   a first OR gate having a first input terminal coupled to the output terminal of the D flip-flop, and a second input terminal coupled to receive a mode signal indicative of CCM or QR mode; and
   a first AND gate having a first input terminal, a second input terminal and an output terminal, wherein the first input terminal is coupled to an output terminal of the first OR gate, the second input terminal is coupled to receive the pulse frequency modulation signal, the first AND gate provides the primary on enable signal at the output terminal.

4. The controller of claim 1, further comprising:
   a second comparison circuit configured to compare a primary current sensing signal indicative of a current flowing through the primary switch with a first threshold voltage and generate a second comparison signal; and
   wherein the primary logic circuit is further coupled to the output terminal of the second comparison circuit to receive the second comparison signal, and based on the second comparison signal and the synchronous signal, the primary logic circuit generates the primary control signal.

5. The controller of claim 1, wherein the valley detection circuit comprises:
   a valley comparator coupled to the secondary switch, and configured to compare a drain voltage of the secondary switch with the output voltage and provide a valley comparison signal at an output terminal;

a flip-flop having a set terminal, a reset terminal and an inverted output terminal, wherein the set terminal is configured to receive the primary on enable signal, the reset terminal is configured to receive the secondary control signal through a falling edge trigger circuit;

a second AND gate having a first input terminal, a second input terminal and an output terminal, wherein the first input terminal is coupled to receive the valley comparison signal, the second input terminal is coupled to the inverted output terminal of the flip-flop; and a pulse generator coupled to the output terminal of the second AND gate and configured to provide the valley pulse signal.

6. The controller of claim 1, further comprising:

a valley selection circuit configured to receive the pulse frequency modulation signal and the valley pulse signal, wherein based on the pulse frequency modulation signal, the valley pulse signal and a last-cycle valley number, the valley selection circuit generates a target valley number and provides a valley enable signal corresponding to the target valley number; and wherein the primary on enable circuit further comprises a third input terminal configured to receive the valley enable signal, based on the pulse frequency modulation signal, the valley pulse signal and the valley enable signal, the primary on enable circuit provides the primary on enable signal at the output terminal.

7. The controller of claim 6, wherein when the target valley number is zero, the mode signal indicates that the switching converter enters CCM.

8. The controller of claim 6, wherein the number of pulses of the valley pulse signal is counted during the period from when the primary switch is turned on to when the rising edge of the pulse frequency modulation signal arrives, and the target valley number is generated by comparing the counted number with the last-cycle valley number.

9. The controller of claim 8, wherein the valley selection circuit comprises:

a counter configured to start counting the number of pulses of the valley pulse signal when the primary switch is turned on and output a first count;

a register configured to record the number of pulses of the valley pulse signal during the period from when the primary switch is turned on to when the rising edge of the pulse frequency modulation signal arrives, and output a second count;

a target valley number generator configured to compare the second count with the last-cycle valley number and provide the target valley number; and a digital comparator configured to provide the valley enable signal by comparing the first count and the target valley number, wherein when the first count becomes greater than or equal to the target valley number, the valley enable signal is asserted.

10. The controller of claim 9, wherein:

when the second count is greater than the last-cycle valley number, the target valley number is equal to the last-cycle valley number plus one;

when the last-cycle valley number is greater than 3 and is greater than the second count by 2, the target valley number is equal to the last-cycle valley number minus 1; and when the last-cycle valley number is 1 and when the rising edge of the pulse frequency modulation signal PFM is a first preset time earlier than a first pulse of the valley pulse signal, the target valley number is equal to 0; and when the last-cycle valley number is 2 and when the rising edge of the pulse frequency modulation signal PFM is a second preset time earlier than the first pulse of the valley pulse signal, the target valley number is equal to 1.

11. The controller of claim 10, wherein when the valley enable signal is asserted and the rising edge of the pulse frequency signal arrives, the primary on enable signal is asserted, the primary switch is controlled to turn on.

12. A controller used in an isolated switching converter, wherein the isolated switching converter has a transformer having a primary winding and a secondary winding, a primary switch coupled to the primary winding, a secondary switch coupled to the secondary winding and an isolation circuit, the controller comprises:

a valley detection circuit coupled to the secondary switch for detecting a resonant voltage of the switching converter, and configured to provide a valley pulse signal in response to one or more valleys of the resonant voltage;

a pulse frequency modulation circuit configured to receive a feedback signal indicative of an output voltage of the switching converter and to provide a pulse frequency modulation signal;

a valley selection circuit configured to receive the pulse frequency modulation signal and the valley pulse signal, and provide a valley enable signal corresponding to a target valley number, wherein the target valley number is generated based on the pulse frequency modulation signal, the valley pulse signal and a last-cycle valley number;

a primary on enable circuit configured to provide a primary on enable signal based on the pulse frequency modulation signal, the valley pulse signal and the valley enable signal, and send the primary on enable signal to an input terminal of the isolation circuit;

a primary off detection circuit configured to detect whether the primary switch is off and generate a primary off detection signal;

a zero cross detection circuit configured to detect whether a current flowing the secondary switch crosses zero and generate a zero cross detection signal;

a secondary logic circuit configured to generate a secondary control signal to control the secondary switch based on the primary off detection signal, the zero cross detection signal and the primary on enable signal; and a primary logic circuit coupled to an output terminal of the isolation circuit to receive a synchronous signal electrically isolated from the primary on enable signal, wherein based on the synchronous signal, the primary logic circuit generates a primary control signal to control the primary switch.

13. The isolated switching converter of claim 12, wherein the number of pulses of the valley pulse signal is counted during the period from when the secondary switch is turned off to when the rising edge of the pulse frequency modulation signal arrives, and the target valley number is determined based on the comparison between the counted number and the last-cycle valley number, to keep the last-cycle valley number unchanged or switch to another valley number.

14. The isolated switching converter of claim 13, wherein the valley selection circuit comprises:

a counter configured to start counting the number of pulses of the valley pulse signal when the primary switch is turned on and output a first count;

a register configured to record the number of pulses of the valley pulse signal during the period from when the primary switch is turned on to when the rising edge of the pulse frequency modulation signal arrives, and output a second count;

a target valley number generator configured to compare the second count with the last-cycle valley number and provide the target valley number; and a digital comparator configured to provide the valley enable signal by comparing the first count and the target valley number, wherein when the first count becomes greater than or equal to the target valley number, the valley enable signal is asserted.

15. A control method of an isolated switching converter, wherein the isolated switching converter has a transformer having a primary winding and a secondary winding, a primary switch coupled to the primary winding and a secondary switch coupled to the secondary winding, the control method comprises:

generating a pulse frequency modulation signal based on a feedback signal indicative of an output voltage of the isolated switching converter;

coupling to the secondary switch and generating a valley pulse signal by detecting one or more valleys of the resonant voltage across the secondary switch;

generating a target valley number based on the pulse frequency modulation signal, the valley pulse signal and a last-cycle valley number and providing a valley enable signal corresponding to the target valley number;

generating a primary on enable signal based on the valley enable signal, the pulse frequency modulation signal and the valley pulse signal;

sending the primary on enable signal to an input terminal of the isolation circuit and generating a synchronous signal electrically isolated from the primary on enable signal; and generating a primary control signal to control the primary switch based on the synchronous signal.

16. The control method of claim 15, further comprising:
generating a primary off detection signal by detecting whether the primary switch is off;
generating a zero cross detection signal by detecting whether the current flowing through the secondary switch crosses zero; and
generating a secondary control signal to control the secondary switch based on the primary off detection signal and the zero cross detection signal.

17. The control method of claim 16, wherein generating the target valley number comprising:

counting the number of pulses of the valley pulse signal during the period from when the primary switch is turned on to when the rising edge of the pulse frequency modulation signal arrives;

comparing the counted number with the last-cycle valley number; and providing the target valley number based on the comparison result.

18. The control method of claim 17, wherein providing the valley enable signal comprising:

starting counting the number of pulses of the valley pulse signal when the primary switch is turned on and outputting a first count;

recording the number of pulses of the valley pulse signal during the period from when the primary switch is turned on to when the rising edge of the pulse frequency modulation signal arrives, and outputting a second count;

comparing the second count with the last-cycle valley number and providing the target valley number;

providing the valley enable signal by comparing the first count and the target valley number, wherein when the first count becomes greater than or equal to the target valley number, the valley enable signal is asserted.

19. The control method of claim 18, further comprising:
when the second count is greater than the last-cycle valley number, the target valley number is equal to the last-cycle valley number plus 1;

when the last-cycle valley number is greater than 3 and is greater than the second count by 2, the target valley number is equal to the last-cycle valley number minus 1;

when the last-cycle valley number is 1 and when the rising edge of the pulse frequency modulation signal PFM is a first preset time earlier than a first pulse of the valley pulse signal, the target valley number is equal to zero; and when the last-cycle valley number is 2 and when the rising edge of the pulse frequency modulation signal PFM is a second preset time earlier than the first pulse of the valley pulse signal, the target valley number is equal to 1.

20. The control method of claim 19, wherein the isolated switching converter enters into CCM when the target valley number is zero.

* * * * *